3,733,418
METHOD OF TREATING HYPERLIPEMIA USING BIS(SUBSTITUTED PHENYL) ACETALS
Albert J. Frey, Essex Fells, and Mario G. Buzzolini, Morristown, N.J., assignors to Sandoz, Inc., Hanover, N.J.
No Drawing. Original application Feb. 7, 1969, Ser. No. 797,661, now Patent No. 3,578,712. Divided and this application Jan. 13, 1971, Ser. No. 106,254
Int. Cl. A61k 27/00
U.S. Cl. 424—324     18 Claims

ABSTRACT OF THE DISCLOSURE

The compounds are para-substituted bis-phenylacetals of N-amidinoglyoxylamide, and non-toxic acid addition salts thereof, e.g., bis(p-chlorophenyl)acetal of N-amidinoglyoxylamide, are useful for treating hyperlipemia. They are obtainable by reaction of an appropriate lower alkyl ester of bis(p-halophenoxy)acetic acid with guanidine.

This application is a division of Ser. No. 797,661, filed Feb. 7, 1969; now U.S. Pat. 3,578,712.

This invention relates to bis-phenoxy acetic acid derivatives and more particularly to para-substituted- bis-phenyl-acetals of N-amidinoglyoxylamide and their non-toxic acid addition salts and to the preparation of such compounds, as well as to therapeutic compositions containing such compounds and to the use of such compositions.

The para-substituted-bis-phenyl-acetals of N-amidinoglyoxylamide of this invention, are conveniently represented the the structural Formula I

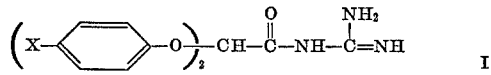

wherein X is a halogen having an atomic weight of from 35 to 127, i.e. a chlorine, bromine or iodine atoms.

Compounds I are obtained by reaction of guanidine with a lower alkyl ester of an appropriate bis(p-halophenoxy)acetic acid, i.e. a compound II (Step A)

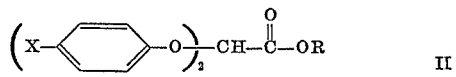

wherein X is as defined above and R is lower alkyl, e.g., having from 1 to 4 carbon atoms, e.g., methyl, ethyl, propyl or butyl and preferably methyl or ethyl.

The reaction (Step A) may be carried out in the conventional manner for the reaction of an ester of an organic acid with guanidine to form the corresponding N-amidinoglyoxylamide of the organic acid. For example, the guanidine reactant may be contacted with a compound II in an inert organic solvent, preferably at the refluxing temperature of the solvent. Preferred solvents are alkanols of the formula R—OH, wherein R is as defined above, e.g., ethanol.

Guanidine is conveniently stored in the form of a salt thereof. It is advantageous to release free guanidine from its salt form just prior to carrying out Step A. For example, a mineral acid salt of guanidine, such as the nitrate, is treated with a sufficient amount of a strong base, e.g., sodium ethoxide, in an inert organic solvent to release guanidine in its free form, which is then promptly used as reactant in Step A.

Various compounds II, e.g. methyl ester of bis(p-chlorophenoxy) acetic acid, are known and may be prepared by methods described in the literature or where not known they may be prepared in a manner analogous to that described in the literature, e.g., Netherlands Pat. 6,706,300 (published Nov. 13, 1967) and e.g., Brunet et al. in Societe Chimique de France Bulletin, vol. 5, page 383, January, March (1964).

The compounds of Formula I are useful because they possess pharmacological activity in animals. In particular these compounds are useful as hypocholesteremics/hypolipemics, as indicated by their activity in a group of white rats which are given 30 milligrams per kilogram of body weight per diem of the compound orally, for 6 days, and then anesthetized with sodium hexabarbital, bled and then tested by extracting serum of plasma with isopropanol and noting the cholesterol and triglyceride contents as compared to those of a control group. The cholesterol and triglyceride contents are determined by known methods, such as described by Tims, A. R. et al., J. of Lipid Research 9:675 (1968), and Technicon Symposium, Mediad, Inc., New York, pages 341–347, (1965). For such usage, the compounds may be administered orally as such or admixed with conventional pharmaceutical carriers. They may be be administered orally in such forms as tablets, dispersible powders, granules, capsules, syrups and elixirs, and parenterally as solutions, suspensions, dispersions, emulsions and the like, e.g., a sterile injectable aqueous suspension. The compositions for oral use may contain one or more conventional adjuvants, such as sweetening agents, flavoring agents, coloring agents and preserving agents, in order to provide an elegant and palatable preparations. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g. magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The dosage of active ingredient employed for treatment of hyperlipemia may vary depending on the particular compound employed and the severity of the condition being treated. However, in general, satisfactory results are obtained when the Compound I are administered at a daily dosage of from about 0.5 milligram to about 50 milligrams per kilogram of animal body weight, preferably given in divided doses two to four times a day, or in sustained release form. For most large mammals, the total daily dosage is from about 50 to about 2000 milligrams. Dosage forms suitable for internal use comprise from about 12.5 to about 500 milligrams of the active compound.

The preferred pharmaceutical compositions from the standpoint of preparation and ease of administration are solid compositions, particularly hard-filled capsules and tablets containing from about 25 to 250 milligrams of the active ingredient.

The Compounds I may be similarly administered in the form of their non-toxic pharmaceutically acceptable acid addition salts. Such salts do not materially differ from the free base forms of Compounds I in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, p-toluene-sulfonate, benzenesulfonate and the like.

The following examples serve to further illustrate the present invention. However, it is to be understood that the examples are for purposes of illustration only and are not intended as in any way limiting the scope of the invention. Furthermore, it is to be understood that the active ingredient used in Examples 2 and 3 can be replaced by any of the other compounds of Formula I or appropriate salts, and there are likewise obtained pharmaceutical compositions suitable for the treatment of hypercholesteremia/hyperlipemia.

EXAMPLE 1

N-amidinoglyoxylamide, bis(p-chlorophenyl)acetal

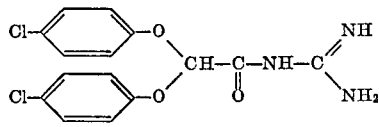

2.3 g. (0.1 g. atom) sodium metal is dissolved with stirring in 150 ml. absolute ethanol. 12.2 g. (0.1 mole) guanidine nitrate is added as a solid and the mixture allowed to stir at room temperature (25° C.) for 1 hour. The sodium nitrate which is formed is filtered off and washed with 30 ml. absolute ethanol. After concentrating the combined wash and filtrate to a volume of about 50 ml. 32 g. (0.1 mole) of methyl bis(p-chloro-phenoxy)-acetate is added thereto. The mixture is heated for 1 hour on a steam bath, the solvent then partially removed by evaporation under vacuum, and the product allowed to crystallize out over a period of about 18 hours. The crystals of N-amidinoglyoxylamide, bis(p-chlorophenyl)acetal are collected and washed with 30 ml. absolute ethanol; M.P. 175.5–176.5° C.

10 g. of N-amidinoglyoxylamide, bis(chlorophenyl) acetal is dissolved in 40 ml. absolute ethanol, then 70 ml. of hydrogen chloride-saturated ethanol is added thereto. Impurities are filtered off, the filtrate is then concentrated and the hydrogen chloride salt of N-amidinoglyoxylamide, bis(p-chlorophenyl)acetal crystallized therefrom; M.P. 212.5–215° C. (dec.).

EXAMPLE 2

Tablets suitable for oral administration and containing the following ingredients are prepared by conventional tabletting techniques.

| Ingredient: | Weight (mg.) |
|---|---|
| N-amindinoglyoxylamide, bis(p-chlorophenyl) acetal | 250 |
| Tragacanth | 10 |
| Lactose | 197.5 |
| Corn starch | 25 |
| Talcum | 15 |
| Magnesium stearate | 2.5 |

The tablets so prepared are useful in the treatment of hypercholesteremia at a dose of one tablet, 2 to 4 times a day.

EXAMPLE 3

Dry filled capsules

Capsules suitable for oral administration containing the following ingredients are prepared in conventional manner.

| Ingredient: | Weight (mg.) |
|---|---|
| N-amidinoglyoxylamide, bis(p-chlorophenyl) acetal | 250 |
| Inert solid diluent (starch, lactose, or kaolin) | 250 |

The capsules so prepared are useful in the treatment of hypercholesteremia at a dose of one capsule, 2 to 4 times a day.

What is claimed is:

1. A pharmaceutical composition for treating hyperlipemia comprising an effective amount for lowering the blood serum lipid level in mammals, of a compound which is an N-amidinoglyoxylamide of the formula

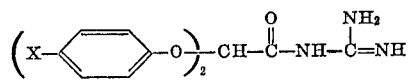

wherein X is a halogen atom having an atomic weight of from 35 to 127; or a non-toxic pharmaceutically acceptable acid addition salt thereof, and a pharmaceutically acceptable carrier therefor.

2. The composition of claim 1 which is suitable for oral administration wherein the carrier is an orally administrable carrier.

3. The composition of claim 2 wherein the carrier is solid.

4. The composition of claim 3 wherein X is chlorine.

5. The composition of claim 4 wherein the compound is the hydrochloride salt of N-amidinoglyoxylamide, bis-(p-chlorophenyl) acetal.

6. The pharmaceutical composition in accordance with claim 1 in unit dosage form for treating hyperlipemia comprising as an active ingredient thereof a compound which is an N-amidinoglyoxylamide of the formula

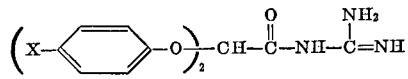

wherein X is a halogen atom having an atomic weight of from 35 to 127; or a non-toxic pharmaceutically acceptable acid addition salt thereof, and a pharmaceutically acceptable carrier therefor; said compound being present in an amount from about 12.5 milligrams to about 500 milligrams.

7. The composition of claim 6 which is suitable for oral administration wherein the carrier is an orally administrable carrier.

8. The composition of claim 7 wherein the carrier is solid.

9. The composition of claim 8 which is a hard-filled capsule or tablet wherein the compound is present in the composition in an amount of from about 25 milligrams to 250 milligrams.

10. The composition of claim 8 wherein X is chlorine.

11. The composition of claim 10 wherein the compound is the hydrochloride salt of N-amidinoglyoxylamide, bis-(p-chlorophenyl) acetal.

12. A method for treating hyperlipemia in a patient, comprising administering to said patient an effective amount for lowering the blood serum lipid level of a compound which is an N-amidinoglyoxylamide of the formula

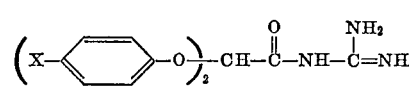

wherein X is a halogen atom having an atomic weight of from 35 to 127; or a non-toxic pharmaceutically acceptable acid addition salt thereof.

13. The method of claim 12 wherein X is chlorine.

14. The method of claim 13 wherein the compound is the hydrochloride salt of N-amidinoglyoxylamide, bis-(p-chlorophenyl) acetal.

15. The method in accordance with claim 12 wherein said effective amount is from about 50 milligrams to about 2,000 milligrams per day.

16. The method of claim 15 wherein the compound is administered orally.

17. The method of claim 16 wherein X is chlorine.

18. The method of claim 17 wherein the compound is the hydrochloride salt of N-amidinoglyoxylamide, bis-(p-chlorophenyl) acetal.

References Cited
UNITED STATES PATENTS 3,325,488   6/1967   Lafon _____ 260—559

JEROME D. GOLDBERG, Primary Examiner

A. J. ROBINSON, Assistant Examiner